United States Patent
Betz

(10) Patent No.: US 7,427,084 B1
(45) Date of Patent: *Sep. 23, 2008

(54) HOSE-IN-HOSE COUPLER WITH LONGITUDINALLY SHIFTABLE SLEEVE

(76) Inventor: James C. Betz, 19630 Old Ridge Rd., South Bend, IN (US) 46614

( * ) Notice: Subject to any disclaimer, the term of this patent is extended or adjusted under 35 U.S.C. 154(b) by 0 days.

This patent is subject to a terminal disclaimer.

(21) Appl. No.: 11/450,866

(22) Filed: Jun. 9, 2006

(51) Int. Cl.
*F16L 17/00* (2006.01)
*F16L 19/00* (2006.01)

(52) U.S. Cl. .............................. 285/123.15; 285/123.1; 285/123.16; 285/123.17

(58) Field of Classification Search .............. 285/123.1, 285/123.15, 123.16, 123.17, 123.5, 123.12, 285/123.3, 904
See application file for complete search history.

(56) References Cited

U.S. PATENT DOCUMENTS

| 578,474 | A | 3/1897 | Thompson et al. |
| 797,911 | A | 8/1905 | Perry |
| 1,160,703 | A | 11/1915 | Fleming |
| 1,217,543 | A | 2/1917 | White |
| 1,349,663 | A | 8/1920 | Cumfer |
| 4,108,476 | A | 8/1978 | Krupp |
| 4,687,232 | A | 8/1987 | Zimmerman |
| 5,011,193 | A | 4/1991 | Porte |
| 5,088,774 | A | 2/1992 | Spiegelman |
| 5,141,256 | A | 8/1992 | Ziu |
| 5,547,231 | A | 8/1996 | Sharp |
| 6,196,596 | B1 | 3/2001 | Kwok et al. |
| 6,682,102 | B1 * | 1/2004 | Betz ...................... 285/123.15 |
| 6,913,291 | B1 * | 7/2005 | Betz ...................... 285/123.15 |
| 2002/0093195 | A1 | 7/2002 | Poehler |

FOREIGN PATENT DOCUMENTS

| CA | 672802 | 10/1963 |
| DE | 1119609 | 12/1961 |
| DE | 39 36 588 C1 | 3/1989 |
| DE | 100 64 227 C1 | 12/2000 |
| FR | 1.529.814 | 6/1968 |

* cited by examiner

*Primary Examiner*—James M Hewitt
*Assistant Examiner*—Jay R Ripley
(74) *Attorney, Agent, or Firm*—Botkin & Hall, LLP

(57) ABSTRACT

A double walled assembly including a primary assembly and a secondary containment assembly. The secondary containment assembly has a second hose casing, a second fixed containment casing and a second releasable coupler assembly mounted on the second hose casing and including a longitudinally shiftable sleeve part. The sleeve part has a first longitudinal position where it can be sealingly coupled to the second fixed containment casing and a second longitudinal position where it is spaced from the second fixed containment casing and exposes the primary assembly. Non-threaded interfaces on the sleeve part and the second fixed containment casing can be sealingly coupled when the sleeve is in its first longitudinal position. The sleeve part may be slidingly or threadingly mounted on a shank that is sealingly coupled to the second hose casing.

3 Claims, 4 Drawing Sheets

HOSE-IN-HOSE COUPLER WITH LONGITUDINALLY SHIFTABLE SLEEVE

CROSS REFERENCE TO RELATED PATENTS

The disclosures of U.S. Pat. Nos. 6,682,102 and 6,913,291 are hereby incorporated herein by reference.

BACKGROUND OF THE INVENTION

1. Field of the Invention

The present invention relates to a hose-in-hose or double walled hose, and, more particularly, to a hose-in-hose secondary coupler.

2. Description of the Related Art

It is known that hose-in-hoses have been used to transport liquid waste, such as nuclear waste, to a place away from the source.

A problem with current hose-in-hose configurations is that once the outer hose is disconnected via a coupler, the separated ends of the outer hoses must be physically pulled apart to allow access to the inner hose. Although on shorter lengths of hose this may not present much of a problem, as the length of the hose increases the difficulty in providing adequate force to pull apart the disconnected ends also increases. The ability to adequately separate the disconnected ends of the outer hose to a significant distance thereby allowing access to the inner hose relies on the strength of the end user. Furthermore, longer hoses may not be able to be separated at the coupler due to the weight of the individual hose ends.

What is needed is a device which allows access to the inner hose without the need to substantially move the two disconnected ends of the outer hose.

SUMMARY OF THE INVENTION

The present invention provides a first releasable coupler assembly and a second releasable coupler assembly that can be advantageously employed with a double walled system wherein one end of the system being coupled is fixed in place, such as a double walled inlet and/or outlet on a piece of equipment.

The invention comprises, in one form thereof, a longitudinally extending double walled assembly including a primary assembly including a first hose casing, a first fixed conduit casing and a first releasable coupler assembly. The first coupler assembly connects the first hose casing and the first fixed conduit casing. The double walled assembly also includes a secondary containment assembly having a second hose casing, a second fixed containment casing and a second releasable coupler assembly. The second releasable coupler assembly is mounted on the second hose casing and includes a longitudinally shiftable substantially cylindrical sleeve part. The sleeve part is longitudinally shiftable independently of the first releasable coupler assembly and has a first longitudinal position extending outwardly from the second hose casing toward the second fixed containment casing and a second longitudinal position retracted toward said second hose casing and spaced from the second fixed containment casing. The sleeve part has a first non-threaded interface and the second fixed containment casing has a second non-threaded interface. The first and second non-threaded interfaces are sealingly couplable when the sleeve part is in the first longitudinal position. When the sleeve part is in the second longitudinal position, the primary assembly and its first releasable coupler assembly are exposed.

The sleeve part may be slidingly or threadingly mounted on a shank that is sealingly coupled to the second hose casing.

The invention comprises, in another form thereof, a longitudinally extending double walled assembly that includes a primary assembly having a first hose casing, a first fixed conduit casing and a first releasable coupler assembly. The first coupler assembly connects the first hose casing and the first fixed conduit casing. The double walled assembly also includes a secondary containment assembly having a second hose casing, a second fixed containment casing and a second releasable coupler assembly. The second coupler assembly is mounted on the second hose casing and includes a shank and a longitudinally shiftable sleeve part. The shank is sealingly coupled to the second hose casing and extends longitudinally toward the second fixed containment casing. The sleeve part has a first longitudinal position extending toward the second fixed containment casing and a second longitudinal position retracted toward the second hose casing and spaced from the second fixed containment casing. The sleeve part is sealingly couplable to the second fixed containment casing in the first longitudinal position and the primary assembly and its first releasable coupler assembly are exposed when the sleeve part is in the second longitudinal position. The sleeve part is slidably mounted on the shank and is longitudinally shiftable independent of the first releasable coupler assembly. A collar is securable on the shank in abutting engagement with the sleeve part when the sleeve part is in the first longitudinal position. This abutting engagement between the collar and the sleeve part inhibits longitudinal movement of the sleeve part toward the second hose casing.

The invention comprises, in yet another form thereof, a longitudinally extending double walled assembly that includes a primary assembly having a first hose casing, a first fixed conduit casing and a first releasable coupler assembly. The first coupler assembly connects the first hose casing and the first fixed conduit casing. The double walled assembly also includes a secondary containment assembly having a second hose casing, a second fixed containment casing and a second releasable coupler assembly. The second coupler assembly is mounted on the second hose casing and includes a shank and a longitudinally shiftable sleeve part. The shank is sealingly coupled to the second hose casing and extends longitudinally toward the second fixed containment casing. The sleeve part has a first longitudinal position extending outwardly toward the second fixed containment casing and a second longitudinal position retracted toward the second hose casing and spaced from the second fixed containment casing. The sleeve part is sealingly couplable to the second fixed containment casing in the first longitudinal position and the primary assembly and its first releasable coupler assembly are exposed when the sleeve part is in the second longitudinal position. The sleeve part is threadingly longitudinally shiftably mounted on said shank and longitudinally shiftable independent of the first releasable coupler assembly. A collar is threadingly mounted on the shank and abuttingly engageable with the sleeve part when the sleeve part is in the first longitudinal position. This abutting engagement between the collar and the sleeve part inhibits longitudinal movement of the sleeve part toward the second hose casing.

An advantage of the present invention is that it provides a convenient mechanism for accessing the primary hose and coupling assembly at a joint in a hose-in-hose assembly including a joint between a hose-in-hose assembly and a fixed in place piece of machinery or equipment.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1A is a detail view of a portion of FIG. 1.

FIG. 1B is another detail view of a portion of FIG. 1.

FIG. 3A is a detail view of a portion of FIG. 3.

FIG. 3B is another detail view of a portion of FIG. 3.

Figure 1:
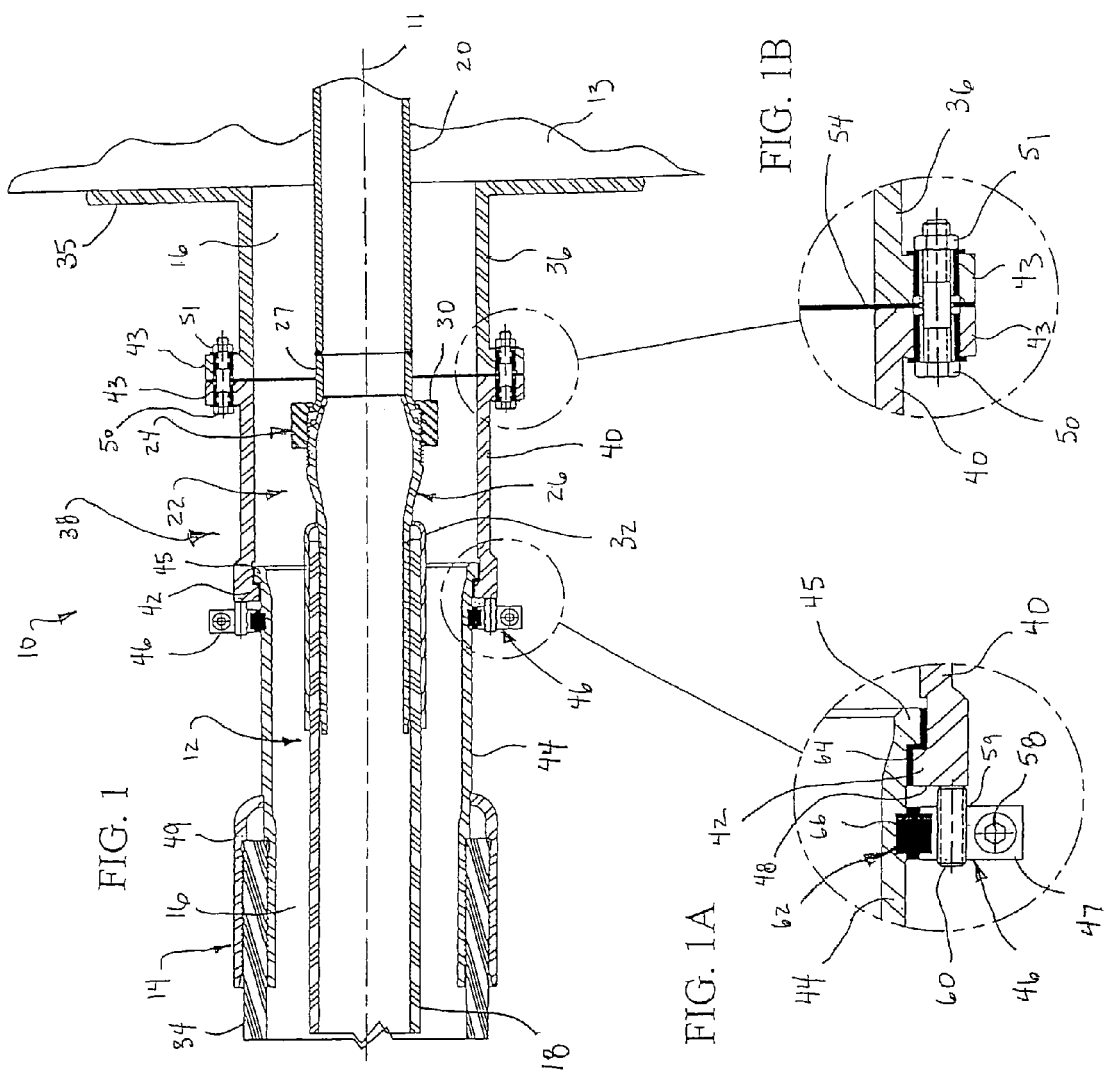
FIG. 1 is a longitudinal sectional view of a first embodiment of a coupling assembly between a primary hose and secondary hose on one end and a fixed primary conduit and a fixed secondary conduit on the other end.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

Figure 2:
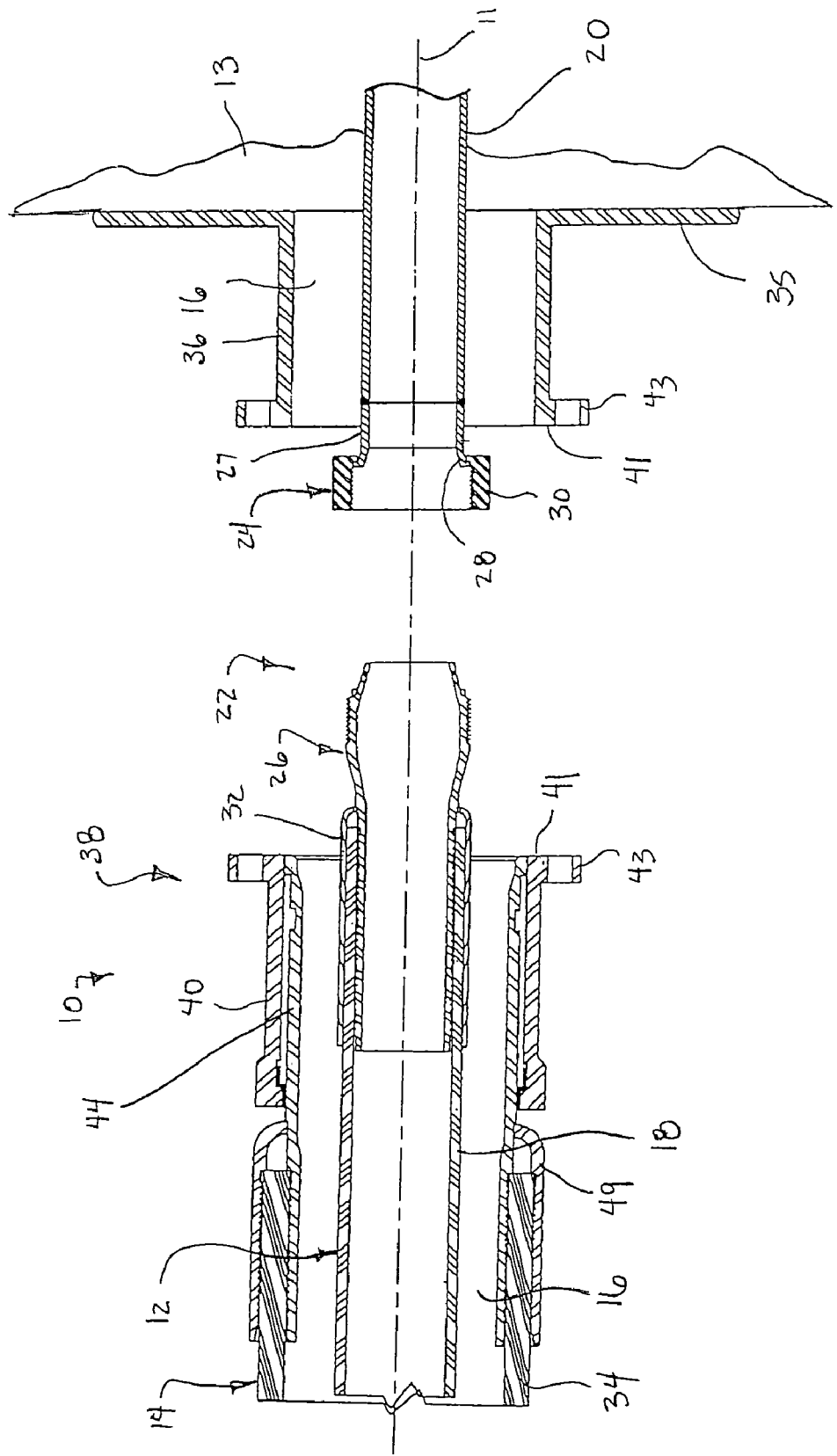
FIG. 2 is a longitudinal sectional view of the first embodiment of FIG. 1 showing both the primary and the secondary coupling in a disconnected or open position.

A first embodiment of a longitudinally extending double wall assembly 10 is illustrated in FIGS. 1 and 2. Assembly 10 defines a longitudinal axis 11. Double wall assembly 10 includes two distinct components, namely, a primary or inner liquid conveying assembly 12 and a secondary or outer containment assembly 14. Secondary assembly 14 encases the primary assembly 12 thereby creating a containment space 16 between the outer surface of primary assembly 12 and the inner surface of secondary assembly 14 for containing any liquids leaking from the primary assembly 12 due to a break or tear in primary assembly 12. Primary assembly 12 may be used to transmit and contain liquids, and is particularly suited for transmitting hazardous materials such as nuclear waste, hazardous liquid waste, or contaminated water. In FIG. 1 double wall assembly 10 is shown as a closed system, meaning both the primary and secondary assemblies 12, 14 are sealed. FIG. 2 illustrates double wall assembly 10 with both the primary and secondary assemblies 12, 14 in an open condition.

The illustrated coupler assemblies described herein are shown attaching a hose-in-hose assembly to a fixed double walled liquid conveyance system that is suitable for use as an inlet or outlet on a fixed piece of machinery or equipment. The coupler assemblies illustrated herein, however, could also be employed to join two elongate lengths of hose-in-hose together.

In FIG. 1, primary assembly 12 includes a hose casing 18, a fixed conduit casing 20, and a primary or inner coupler 22. Conduit casing 20 is the primary piping of equipment 13. Inner coupler 22 connects hose casing 18 and conduit casing 20 in such a manner as to create a sealed connection between the two opposing casings 18, 20. Coupler 22 includes a female coupler part 24 and a male coupler part 26, each of which is attached to one of casings 18, 20. In the illustrated embodiment, the male coupler part 26 is attached to hose casing 12 and the female coupler part 24 is attached to conduit casing 20, however, the location of the male and female couplers could be reversed. The coupler part attached to hose casing 18 is secured with a swaged ferrule 32. While in the illustrated embodiment, the coupler part attached to conduit casing 20 is welded thereto. As best seen in FIG. 2, female coupler part 24 includes a piping section 27 welded to conduit casing 20 and having an outturned flanged retainer 28 which carries a rotatable nut 30. Male coupler part 26 is externally threaded and tapered to fit into retainer 28 where it is secured by nut 30.

Secondary containment assembly 14 includes a hose casing 34, a containment casing 36, and a secondary or outer coupler 38. Containment casing 36 includes a radially outwardly extending annular flange 35 that is sealingly secured to equipment 13 such as by welding. Outer coupler 38 releasably connects casings 34, 36 to create a sealed closed system about primary assembly 12. Coupler 38 includes a slideable sleeve part 40, a shank 44 and a collar 46. Shank 44 is attached to hose casing 34 by a swaged ferrule 49. Sleeve part 40 is longitudinally shiftable between a first longitudinal position shown in FIG. 1 where sleeve part 40 is extended toward containment casing 36 and a second longitudinal position shown in FIG. 2 where sleeve part 40 is retracted so that it is spaced from containment casing 36 thereby exposing primary assembly 12 and inner coupler assembly 22. Although inner coupler assembly 22 is also shown in an open position in FIG. 2, sleeve part 40 is longitudinally shiftable independent of the movement of inner coupler assembly 22 and coupler assembly 22 may remain sealed after opening secondary coupler assembly 38.

Sleeve part 40 is provided with a radially inwardly extending projection at one end which takes the form of an annular flange 42 in the illustrated embodiment. Sleeve part 40 includes a radially outwardly extending projection at the opposite end which takes the form of annular flange 43 in the illustrated embodiment. Containment casing 36 also includes a radially outwardly extending annular flange 43 for coupling with the annular flange 43 disposed on sleeve part 40. Sleeve part 40 is mounted so as to slide longitudinally along shank 44. No rotation of sleeve part 40 is required as sleeve 40 is slid along shank 44, however, it is possible to rotate sleeve part 40 relative to shank 44. In this manner, sleeve part 40 of outer coupler 38 can be longitudinally shifted between its retracted position and its extended position. Shank 44 is provided with a radially outwardly extending abutment part 45 that takes the form of an annular flange in the illustrated embodiment. As supported sleeve part 40 is slid outwardly over shank 44 to its first longitudinal position, flange 42 of sleeve part 40 will abut flange 45, thus restricting any further outward movement and retaining sleeve part 40 on shank 44 in its extended position as best seen in FIG. 1A.

As can be seen in FIGS. 1 and 1B, when sleeve part 40 is in its extended position, flanges 43 are aligned in face to face orientation. Each of the annular flanges 43 define a non-threaded interface 41 for sealingly coupling with the opposite annular flange 43. An annular gasket 54 is positioned between the non-threaded interfaces 41 of annular flanges 43 to provide a liquid tight seal. The flanges 43 are joined and secured by annularly spaced threaded fasteners, i.e., bolts 50 and nuts 51, in the illustrated embodiment, however, alternative fastening methods for joining annular flanges 43 together may also be employed.

As best seen in FIGS. 1 and 1A, sleeve part 40 is secured in its extended position on shank 44 by collar 46. Collar 46 is formed of two semicircular half parts 47 joined by screws 58. Once sleeve part 40 is extended, parts 47 of collars 46 are placed round shank 44 and joined by screws 58 with an annular rib 62 carried by collar 46 fitting within an annular groove 66 in shank 44 so as to longitudinally fix collar 46 on shank 44 next to end face 48 of adjacent sleeve 40.

Within each collar 46 and arranged peripherally about the collar are threaded bores 59. Securement screws 60 are turned through each bore 59 in collar 46 into contact with the adjacent end face 48 of sleeve part 40 to urge sleeve flange 42 toward shank flange 45. Annular seal 64 is thereby compressed to form a liquid seal between shank 44 and sleeve 40. Rib 62 may be in the form of an insulator envisioned to work in conjunction with non-conductive hose to allow for the use of a leak detector.

Referring now to FIG. 2, sleeve part 40 is shown in its second longitudinal or retracted position thereby opening outer coupler 38. To retract sleeve part 40, collar 46 is removed by loosening securement screws 60 and removing screws 58 so the two half parts 47 of each collar can be separated and removed from shank 44. Then flanges 43 are disconnected from each other removing bolts 50 and nuts 51, thereby freeing sleeve part 40 from its secured extended position and allowing outer coupler 38 to be opened by slidably retracting sleeve part 40 longitudinally along shank 44. Although collar 46 is shown completely removed in FIG. 2, it could also be slid along sleeve part 40 after loosening bolts 58 to allow collar parts 47 to be spread apart by a sufficient distance.

When sleeve part 40 is secured in its extended position, outer coupler 38 is in a joined position connecting casings 34, 36 in a sealed position (FIG. 1). When sleeve part 40 is in its retracted position, outer coupler 38 is in an open position (FIG. 2) thereby exposing primary assembly 12 and its coupler 22. When outer coupler 38 is in its open position (FIG. 2) inner coupler 22 can be opened and closed as needed.

Double wall assembly 10 will contain liquids which may leak from a rupture of primary assembly 12 and thereby prevent potentially hazardous liquids from causing damage to the environment or injury to the end user. Secondary or outer coupler 38 provides the advantage of allowing access to the primary hose assembly 12 via the use of slideable sleeve part 40 without needing to further separate casings 34, 36. Further, the use of insulated materials would allow use of a signal or an alarm device, which may be present on or around the assembly, thereby notifying the end user of leakage from the primary hose.

A second embodiment 110 of a longitudinally extending double wall assembly is illustrated in FIGS. 3, 3A, 3B and 4. Assembly 110 defines a longitudinal axis 111. Double wall assembly 110 includes an inner or primary assembly 112 and an outer or secondary assembly 114. Outer assembly 114 encases inner assembly 112, creating a containment space 116 therebetween for containing any leakage from the inner assembly 112.

Inner or primary assembly 112 includes a hose casing 118, a conduit casing 120 and an inner or primary coupler 122 for sealingly connecting casings 118 and 120. Conduit casing 120 is the primary piping of equipment 113. Coupler 122 includes a female coupler part 124 attached to a hose casing 118 and a male coupler part 126 attached to casing 120. Coupler part 124 is connected to hose casing 118 with a swaged ferrule 132. Female coupler part 124 carries a rotatable threaded nut 130 and includes an outturned retainer flange 128 for retaining the nut on the couple part. Male coupler part 126 is tapered to fit into retainer flange 128 and is externally threaded for securement within retainer flange 128 by nut 130. In the illustrated embodiment, male coupler part 126 is welded to conduit casing 120.

Outer or secondary assembly 114 includes a hose casing 134, a containment casing 136, and an outer or secondary coupler 138 for sealingly connecting casings 134 and 136. Containment casing 136 includes a radially outwardly extending annular flange 135 that is sealingly secured to equipment 113 such as by welding. Outer coupler 138 includes threaded sleeve 140, threaded shank 142 and threaded collar 144. Shank 142 is attached to hose casing 134 by a swaged ferrule 146 carried by a stem 145. Shank 142 is shown threadedly connected to stem 145 by a tapered interfit. Alternatively, shank 142 could be attached to stem 145 by other means or fixedly engaged directly to hose casing 134.

Sleeve 140 has a radially inwardly extending projection 148 at one end that takes the form of an annular flange in the illustrated embodiment. Annular flange 148 is interiorly threaded for engagement with exteriorly threaded shank 142. The remaining interior portion of sleeve part 140 has a generally smooth cylindrical surface 139. The interaction of the interfitting helical threads on sleeve part 140 and shank 142 longitudinally shift sleeve part 140 on shank 142 when sleeve part 140 is rotated relative to shank 142. In this manner, sleeve part 140 of outer coupler 138 can shift between its retracted position and its extended position.

Figure 3:
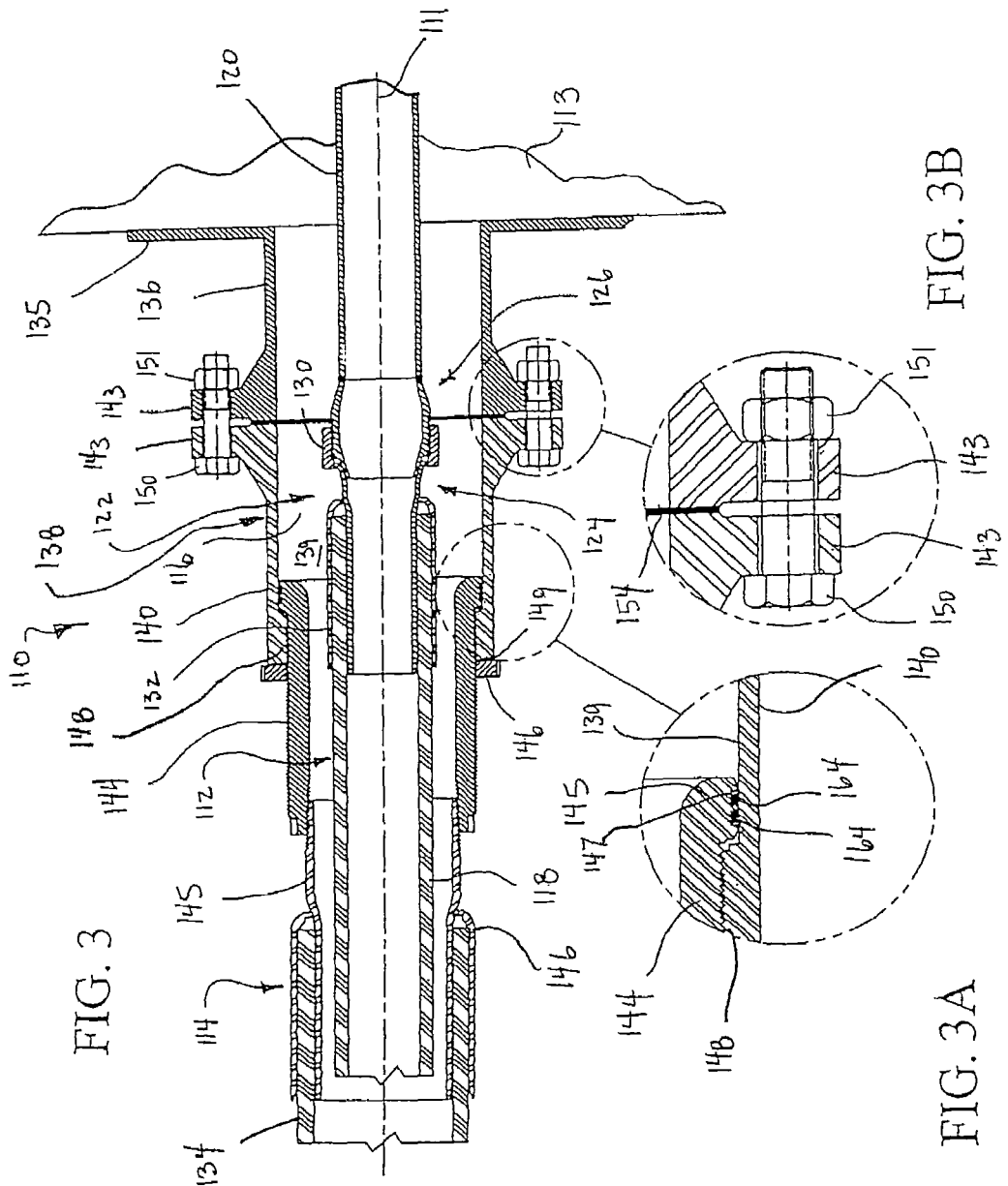
FIG. 3 is a longitudinal sectional view of a second embodiment of a coupling assembly between a primary hose and secondary hose on one end and a fixed primary conduit and a fixed secondary conduit on the other end.

As most easily seen in FIG. 3A, shank 144 is also provided with a radially outwardly extending abutment part 145 that takes the form of an annular flange in the illustrated embodiment. Annular flange 145 will abuttingly engage annular flange 148 on sleeve part 140 if there is an attempt to extend sleeve part 140 beyond the first longitudinal position shown in FIG. 1 and thereby retains sleeve part 140 on shank 144 in its fully extended position as best seen in FIGS. 3 and 3A. Outturned flange 145 on shank 144 has a recess 147 on its radially outer surface. Two annular seal members 164 are disposed in this recess and sealingly engage both the outturned flange 145 on shank 144 and the smooth interior surface 139 of sleeve 140 to thereby provide a liquid tight seal between shank 144 and sleeve 140.

Sleeve part 140 is shown in a first longitudinal position in FIG. 3 extended toward casing 136. Sleeve part 140 includes a radially outwardly extending projection 143 at its distal end which takes the form of annular flange in the illustrated embodiment. Containment casing 136 also includes a radially outwardly extending annular flange 143 for coupling with the annular flange 143 disposed on sleeve part 140. When sleeve part 140 is in its extended position, flanges 143 are aligned in face to face orientation. Each of the annular flanges 143 define a non-threaded interface 141 for sealingly coupling with the opposite annular flange 143. An annular gasket 154 is positioned between the non-threaded interfaces 141 of annular flanges 143 to provide a liquid tight seal. The flanges 143 are joined and secured by annularly spaced threaded fasteners, i.e., bolts 150 and nuts 151, in the illustrated embodiment, however, alternative fastening methods for joining annular flanges 143 together may also be employed.

Sleeve part 140 is also secured in its extended position on shank 144 by collar 146. Collar 146 is substantially ring-shaped and has internal helical threads for threadedly engaging shank 144. Once sleeve part 140 is extended, collar 146 is rotated into abutment with end face 149 of annular flange 148 on sleeve part 140 to thereby prevent longitudinal movement away from containment casing 136 by sleeve part 140.

Figure 4:
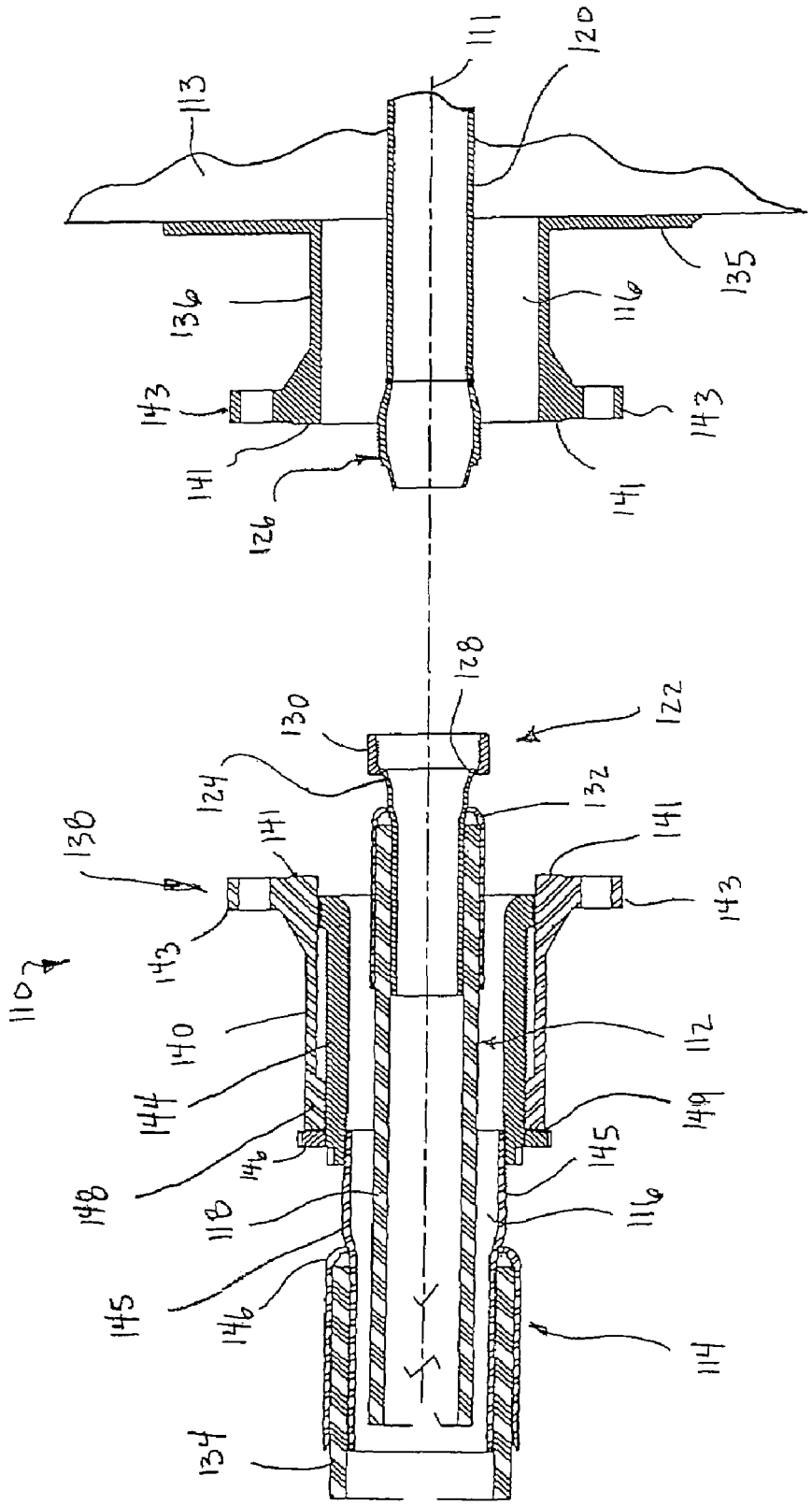
FIG. 4 is a longitudinal sectional view of the second embodiment of FIG. 3 showing both the primary and the secondary coupling in a disconnected or open position.

FIG. 4 illustrates sleeve part 140 in a second longitudinal position where sleeve part 140 has been retracted and is spaced from casing 136 to thereby open outer coupler 138. To retract the sleeve part 140, collar 146 is rotated about shank 144 to longitudinally shift collar 146 toward hose casing 134. Then, flanges 143 are disconnected from each other removing bolts 150 and nuts 151, thereby freeing sleeve part 140 from its secured extended position and allowing outer coupler 138 to be opened by longitudinally shifting sleeve part 140 away from casing 136. Sleeve part 140 is longitudinally shifted away from casing 136 by threadingly retracting sleeve part 140 toward hose casing 134 by rotating sleeve part 140 relative to shank 144.

When sleeve part 140 is secured in its extended position (FIG. 3), outer coupler 138 is in a joined position connecting casings 134, 136 in a sealed condition. When sleeve part 140 is in its retracted position (FIG. 4), outer coupler 138 is in an open position thereby exposing primary assembly 112 and its coupler 122. In this exposed situation, inner coupler 122 may be connected and disconnected.

While this invention has been described as having an exemplary design, the present invention may be further modified within the spirit and scope of this disclosure. This application is therefore intended to cover any variations, uses, or adaptations of the invention using its general principles.

What is claimed is:

1. A longitudinally extending double walled assembly comprising:
   a primary assembly including a first hose casing, a first fixed conduit casing and a first releasable coupler assembly, said first coupler assembly connecting said first hose casing and said first fixed conduit casing; and
   a secondary containment assembly including a second hose casing, a second fixed containment casing and a second releasable coupler assembly;
   said second coupler assembly being mounted on said second hose casing and including a shank having an abutment part and a longitudinally shiftable sleeve part, said shank being sealingly coupled to said second hose casing and extending longitudinally toward said second fixed containment casing, said sleeve part having a first longitudinal position in which said sleeve part extends beyond said shank, said abutment part being a radially outwardly extending projection having an annular seal member sealingly mounted upon said abutment part, said abutment part engageable with said sleeve when said sleeve is positioned proximate said first longitudinal position and inhibiting removal of said sleeve part from said shank, said second fixed containment casing and a second longitudinal position retracted toward said second hose casing and spaced from said second fixed containment casing, wherein said sleeve part is sealingly couplable to said second fixed containment casing in said first longitudinal position, and said primary assembly and its first releasable coupler assembly are exposed when said sleeve part is in said second longitudinal position; said sleeve part being threadingly longitudinally shiftably mounted on said shank and being longitudinally shiftable independent of said first releasable coupler assembly; and
   a collar threadingly mounted on said shank and abuttingly engageable with said sleeve part when said sleeve part is in said first longitudinal position wherein abutting engagement between said collar and said sleeve part inhibits longitudinal movement of said sleeve part toward said second hose casing.

2. A longitudinally extending double walled assembly comprising:
   a primary assembly including a first hose casing, a first fixed conduit casing and a first releasable coupler assembly, said first coupler assembly connecting said first hose casing and said first fixed conduit casing; and
   a secondary containment assembly including a second hose casing having a stem secured to said second hose casing, a second fixed containment casing and a second releasable coupler assembly;
   said second coupler assembly being mounted on said second hose casing and including a shank being threadingly mounted on said stem and a longitudinally shiftable sleeve part, said shank being sealingly coupled to said second hose casing and extending longitudinally toward said second fixed containment casing, said sleeve part having a first longitudinal position in which said sleeve part extends beyond said shank, said second fixed containment casing and a second longitudinal position retracted toward said second hose casing and spaced from said second fixed containment casing, wherein said sleeve part is sealingly couplable to said second fixed containment casing in said first longitudinal position, and said primary assembly and its first releasable coupler assembly are exposed when said sleeve part is in said second longitudinal position; said sleeve part being threadingly longitudinally shiftably mounted on said shank and being longitudinally shiftable independent of said first releasable coupler assembly; and
   a collar threadingly mounted on said shank and abuttingly engageable with said sleeve part when said sleeve part is in said first longitudinal position wherein abutting engagement between said collar and said sleeve part inhibits longitudinal movement of said sleeve part toward said second hose casing.

3. A longitudinally extending double walled assembly comprising:
   a primary assembly including a first hose casing, a first fixed conduit casing and a first releasable coupler assembly, said first coupler assembly connecting said first hose casing and said first fixed conduit casing; and
   a secondary containment assembly including a second hose casing, a second fixed containment casing having a second non-threaded interface being a radially outwardly extending flange and a second releasable coupler assembly;
   said second coupler assembly being mounted on said second hose casing and including a shank and a longitudinally shiftable sleeve part having a first non-threaded interface being a radially outwardly extending flange, said shank being sealingly coupled to said second hose casing and extending longitudinally toward said second fixed containment casing, said sleeve part having a first longitudinal position in which said sleeve part extends beyond said shank, said second fixed containment casing and a second longitudinal position retracted toward said second hose casing and spaced from said second fixed containment casing, wherein said sleeve part is sealingly couplable to said second fixed containment casing in said first longitudinal position, and said primary assembly and its first releasable coupler assembly are exposed when said sleeve part is in said second longitudinal position; said sleeve part being threadingly longitudinally shiftably mounted on said shank and being longitudinally shiftable independent of said first releasable coupler assembly; and
   a collar threadingly mounted on said shank and abuttingly engageable with said sleeve part when said sleeve part is in said first longitudinal position wherein abutting engagement between said collar and said sleeve part inhibits longitudinal movement of said sleeve part toward said second hose casing.

* * * * *